United States Patent [19]

Andreichuk

[11] Patent Number: 4,596,838

[45] Date of Patent: Jun. 24, 1986

[54] MINE STOPPING CAULK

[75] Inventor: Gregory Andreichuk, Clearwater, Fla.

[73] Assignee: The Celotex Corporation, Tampa, Fla.

[21] Appl. No.: 739,251

[22] Filed: May 30, 1985

[51] Int. Cl.[4] ............................................. C08K 3/34
[52] U.S. Cl. ................................... 523/130; 523/131; 524/5; 524/442; 524/446
[58] Field of Search .......................... 524/5, 442, 446; 523/130, 131

[56] References Cited

U.S. PATENT DOCUMENTS

| | | | |
|---|---|---|---|
| 3,243,397 | 3/1966 | Herkimer et al. | 260/29.3 |
| 3,483,156 | 12/1969 | Mills, Jr. et al. | 260/29.6 |
| 3,735,545 | 5/1973 | Bernett | 52/744 |
| 3,854,267 | 12/1974 | Weiant et al. | 52/744 |
| 3,866,383 | 2/1975 | Bernett | 52/744 |
| 3,907,725 | 9/1975 | Forte et al. | 260/17 R |
| 3,915,917 | 10/1975 | Weiant et al. | 260/29.6 H |
| 3,967,429 | 7/1976 | Weiant et al. | 52/744 |
| 4,059,551 | 11/1977 | Weiant et al. | 260/29.6 H |
| 4,351,754 | 9/1982 | Dupre | 524/445 |
| 4,380,595 | 4/1983 | Arpin | 524/5 |
| 4,390,570 | 6/1983 | Rehberg | 427/385.5 |
| 4,472,540 | 9/1984 | Barker | 523/220 |

OTHER PUBLICATIONS

"Elastomeric Roof Mastics," Product Bulletin, Rohm and Haas Company.

*Primary Examiner*—Paul R. Michl
*Attorney, Agent, or Firm*—James W. Grace; Charles W. Vanecek

[57] ABSTRACT

A process for sealing geological formations and mine stoppings by applying to these substrates an aqueous, non-cementitious caulk composition comprising an alkali metal silicate; filler material including at least one silica product or silicate other than an alkali metal silicate; a water-soluble or water-dispersible acrylic polymer modifier; and water, and allowing the caulk composition to dry to form an air flow resistant seal on the substrates. A highly satisfactory polymeric modifier is used in the form of a polymer emulsion, such as an emulsion of a self-plasticizing acrylic polymer having a low Tg.

19 Claims, No Drawings

MINE STOPPING CAULK

BACKGROUND OF THE INVENTION

1. Field of the Invention

This invention relates to a caulk for geological formations and mine stoppings. The caulk is especially suitable as a perimeter and void sealant for new and repair work to ventilation stoppings of coal mines.

2. Description of the Prior Art

Stopping devices are used to control and direct the flow of air through underground passageways and to seal off portions of a mine. The stoppings are often installed in mines so as to direct air flow to the working face and prevent loss of air flow through cross cuts and entries which are not being worked. In ventilating the mine, fresh air is delivered under pressure to the working face and often must travel a considerable distance between the mine opening and the face of the mine. If the stoppings separating the crosscuts and entries are not sufficiently air-tight, the losses will be such as to effectively reduce the velocity of the air at the mine face. It is not uncommon for a mine to lose more than half of its induced air through leaky stoppings and doors. Consequently, the dust and gases in the area being worked by the miners will not be effectively removed to the outside of the mine.

Conventional mine stoppings consist of walls constructed of concrete blocks and cement, and are not very airtight. These mine stoppings are sealed against air flow by coating the stopping face and sealing its perimeter with cementitious type caulks. Current cementitious caulks generally are composed of various inorganic aggregates, including glass fibers, in conjunction with portland cement, and are characterized by a number of deficiencies. Because these caulks are fragile and have limited adhesion to various substrates, such as trona ore, they often separate from these substrates when minor substrate movement occurs. Prior to application of these caulks, the pretreatment of mine formations, such as stopping perimeters, is usually specified and/or required to enhance bonding. The recommended pretreatment is high pressure washing to remove rock dust and dirt. This is a labor-intensive and time-consuming operation requiring a water source, a significant amount of equipment and costly delays before the sealing caulk can be applied to pretreated areas. Also, the caulk is mixed at the work site just prior to application. The procedure is labor intensive as all materials, i.e., bags of dry mix, water, mix containers, tools, etc., must be brought to the work site.

Further disadvantages of current sealants are their extremely short pot-life after mixing and the long time required after application for hardening (4-8 hours) and for the attainment of significant air and moisture resistant properties (in excess of 24 hours). Furthermore, the glass fiber often used is attacked by the high alkalinity of the hydrated portland cement, and therefore loses much of its tensile strength in just a few days. Another factor contributing to the high cost of using current caulk sealants is the need for large dry storage areas to accommodate the required raw material and equipment.

It would be highly desirable if an improved caulk for application to mine stoppings and like formations could be found to overcome the above and other disadvantages of the prior art, and result in the provision of highly airtight constructions which can resist air infiltration for extended periods of time.

OBJECTS OF THE INVENTION

It is therefore an object of the present invention to provide an improved caulk composition and method, which can eliminate or reduce mine stopping air leakage by filling voids in the face and at the perimeter of the stopping, and accordingly contribute to a satisfactory ventilation efficiency in the mine, with resulting health and safety benefits to the miners and lower ventilating power consumption.

It is another object of this invention to provide a mine stopping or similar construction protected against air leaks through a novel sealing system.

These and other objects and advantages of the present invention will become apparent to those skilled in the art from the following detailed description.

SUMMARY OF THE INVENTION

The above objects have been achieved through the development of a non-cementitious caulk sealing composition for sealing off underground openings. The caulk is especially useful in coal mines to minimize leakage of ventilation controls, e.g., stoppings. The caulk broadly comprises an alkali metal silicate, filler material, water and a modifier to prevent water softening of the caulk after application. Advantageously, the modifier is a water-soluble or water-dispersible polymer.

Many types of water-insoluble fillers may be employed in the caulk composition. Illustrative of the fillers which may be used are glass, quartz, silica, barytes, calcium carbonate, sulfates, alumina, various clays, diatomaceous earth and other like inert materials, wollastonite, mica, perlite, flint powder, kryolite, alumina trihydrate, talc, sand, pyrophylite, aluminum oxide, zinc oxide, titanium dioxide, and mixtures thereof.

The polymeric modifier employed is suitably any acrylic polymer or copolymer which will dry to form a water-insoluble film and this type of material is well known to those skilled in the art. The polymers are frequently sold commercially as aqueous emulsions but some are also available in water-soluble forms or as the solid polymer. The latter can be made into dispersions by anyone skilled in the art. In general, a satisfactory water-soluble or water-dispersible polymer is one having an average molecular weight of between about 10,000 and 10,000,000.

Self-plasticizing acrylic polymer emulsions are especially preferred polymeric modifiers of the invention. Caulk compositions containing the non-externally plasticized acrylic polymers form a mine stopping sealant characterized by unusual adhesion and airtightness.

The alkali metal silicate and polymeric modifier are combined with the filler material (e.g., inert pigments or fillers) and, if necessary, auxiliary agents to impart to the caulking composition the appropriate rheology for sealing and bridging the fissures in and around mine stoppings or like formations and to impart other desirable properties, such as acceptable fire performance characteristics with low smoke generation. The aqueous caulk composition generally comprises about 30 to 65% by weight of alkali metal silicate, 30 to 65% by weight of filler material, 2 to 12% by weight of modifier, and 2 to 12% by weight of water.

The excellent workability of the composition of the invention makes it easy to quickly apply the composition by trowel or rubber gloves to the voids being sealed, with no special tools or site preparation required. The caulk is conveniently brought to the application site, e.g., a coal mine stopping, in a premixed and ready-to-use condition. The nontoxic, nonvolatile water based caulking is quick drying and seals against air leaks immediately upon application, and its use is characterized by an easy cleanup.

DETAILED DESCRIPTION OF THE INVENTION

The caulking composition of this invention is highly effective for use in underground coal mines as a sealant against air losses. The caulk is used as a perimeter and void sealant in the installation and repair of mine ventilation stoppings. The composition is composed of filler material, which is preferably inorganic, in a water based alkali metal silicate and polymer system and is especially useful in enhancing the performance of conventional mine stoppings by preventing air infiltration for longer periods of time than conventional sealants.

The alkali metal silicate is preferably sodium silicate. The sodium silicate employed may be any of those available, which includes those having a molar ratio of $SiO_2/Na_2O$ of 1 to 4:1, particularly those composed of between 2 and 4 moles of $SiO_2$ per mole of $Na_2O$. An aqueous solution of the sodium silicate is usually used. Acceptable sodium silicates are discussed in the literature, e.g., in the Reimer U.S. Pat. Nos. 2,207,759 and 2,330,145.

The modifier included in the caulking composition is an agent which acts to desensitize the composition to moisture and thereby prevents resolubilizing of the alkali metal silicate. Highly satisfactory modifying agents are water-soluble or water-dispersible acrylic homopolymers and copolymers having an average molecular weight of at least about 10,000. Illustrative of the polymeric agents are the various homopolymers and copolymers of acrylates, methacrylates, acrylamides, methacrylamides, acrylic acid, and methacrylic acid.

The acrylic homo- or copolymer desirably has a low glass transition temperature, e.g., below 0° C., and good compatibility in the caulking composition. Especially preferred polymers are self-plasticizing thermoplastic acrylic polymers characterized by a low Tg and excellent flexibility. The low Tg (−45° C.) emulsion polymer with internal plasticizer supplied by Rohm and Haas Company under the trademark Rhoplex EC-1685 is an example of such a polymer. Caulking compositions containing this polymer have highly desirable strength characteristics and good adhesion to the mine substrate.

The preferred fillers of the invention are those which are inorganic, and are finely divided, having an average particle size generally less than 200 microns and preferably less than 100 microns. The filler material preferably has a high silica ($SiO_2$) content, such as approximately 60% to 77% by weight of the total caulk composition, although the amount of silica may vary from as low as about 10% to as high as 85% by weight of the composition. Accordingly, the water based caulk advantageously comprises an alkali metal silicate and moisture desensitizer in combination with filler material including at least one member selected from the group consisting of a silica product, a silicate other than an alkali metal silicate, and mixtures thereof. Examples of suitable silicates are asbestos, china clay, mica, talc, alumina silicate, wollastonite, aluminum silicate and calcium silicate. The silica products may be both minerals and synthetic amorphous silica and include diatomaceous earth, quartz and sand.

The caulking composition of the invention suitably comprises 30 to 65, more preferably 35 to 60, most preferably 40 to 55, % by weight of the sodium silicate; 30 to 65, more preferably 35 to 60, most preferably 40 to 55, % by weight of the filler (e.g., silicate filler); 2 to 12, more preferably 3 to 10, most preferably 4 to 9, % by weight of the moisture desensitizer (e.g., polyacrylic); and 2 to 12, more preferably 3 to 10, most preferably 4 to 9, % by weight of water. The composition generally has a viscosity (Brookfield) of 60,000 to 400,000 centipoises measured at 24° C., and a total solids content of from 50 to 70 weight percent.

To improve the viscosity and flow properties of the caulk composition, a thickening agent is advantageously included in an amount of about 0.5 to 3.0% by weight of the composition. The thickening agent can be a filler material or other substance capable of thickening the caulk mixture and improving its thixotropy. The amount of such thickening agent, when used, is generally selected to provide a viscosity in the composition of about 60,000 to 130,000 centipoises. The viscosity is measured at 24° C. with a Brookfield viscometer. Examples of thickening agents include bentonite clays, fumed silicas, water-soluble cellulose ethers, such as methyl cellulose, ethyl cellulose, hydroxyethyl cellulose, carboxymethyl cellulose, sodium alginate, ammonium alginate, and the like.

The caulk composition may be colored or substantially colorless. Besides depending on the color of fillers mentioned above, suitable colored pigments may be added in place of, or in addition to, the fillers. Also, if desired, direct dyes may be introduced to provide a desired color.

Further auxiliary agents generally used in preparing caulking compositions may be used. For instance, the caulk sealant may include buffers, plasticizers, disinfectants, preservatives, and stabilizers.

In a highly advantageous embodiment of the caulking composition of the invention, a liquid sodium silicate solution is mixed with alumina silicate, clay, mica and acrylic emulsion to produce a thick paste. Preferred amounts in weight % of the components are as follows: 35–60%, more preferably 40–45%, of sodium silicate; 30–65%, more preferably 40–45%, of alumina silicate; 5–15%, more preferably 5–8%, of mica; 0.5–3%, more preferably 0.5–1%, of clay; 3–10%, more preferably 3–5%, of acrylic emulsion (63 weight % solids); and 2–10%, more preferably 2–6%, of water. This caulking mix is easily trowellable and additionally is thick enough to seal voids in and around mine stoppings with little or no sagging or loss of seal to air flow.

The physical properties of the caulk composition of the invention make it ideally suited for sealing mine ventilation stopping perimeters to make the sealed surfaces resistant to air leaks. The sealant can be easily transported to the application site. Unlike conventional sealants, which typically have about a 2–3 month storage life and a very short, e.g., 1 hour, pot life after mixing, the present caulk sealant can be stored for a period in excess of 6 months and for practical purposes has an unlimited pot life. Whereas at the application site conventional sealants commonly require mixing equipment, special application equipment, a source of water, and a power source for mixing and application, thus increasing operational cost, the present caulk is ready as received at the site for easy and quick application by trowel or by rubber gloves, without dilution, mixing or the need for special equipment or power. Also, the expenses associated with the cleanup of such equipment are avoided through this invention. In any event, cleanup of the sealant of the invention is easily accomplished with water or soap and water solution. Further cost savings are realized because little manpower is needed to apply the present caulking composition, only one person being required for application of the sealant of the invention to a stopping.

Essentially all that is necessary in the practice of the invention is to carry to the work site a pail(s) of the premixed caulk composite and a tool for application. The caulking composition is stirred before application to the mine formation. It may be simply applied in various ways, such as by trowel, knife, by hand with rubber gloves, and so on. The coverage or spreading rate (mileage) attainable with the composition of the invention is excellent. The sealing of a mine ventilation stopping with the water based caulking system in accordance with the present invention results in an effective seal against air leaks immediately upon application. However, the drying rate of the caulking composition will depend, of course, upon ambient conditions. The simple application procedure of this invention significantly reduces the time and effort required to seal mine stopping voids and perimeters. Moreover, the applied sealant retains its position without sagging or shrinking and in final form is characterized by superior hardness, air flow and water impermeability, chemical resistance, and durability.

The dried caulking composition of the invention is non-flammable. Testing has shown that the sealant does not present a flammability hazard when applied to non-combustible ventilation controls in underground mine passageways. E-84 Flame Spread testing of the caulk coating applied in a film thickness of 0.003–0.005 in. on an asbestos-cement board yielded a flame spread of 0 ft. and a smoke index of 0.

The present invention is further illustrated by the following example in which all percentages are by weight.

EXAMPLE

This example illustrates the preparation of a typical caulking composition by combining the ingredients listed in the following Table according to the procedure described below:

TABLE

| Ingredient | Percentage |
| --- | --- |
| Sodium Silicate | 42.2 |
| Alumina Silicate | 42.2 |
| Mica | 6.8 |
| Bentonite Clay | .68 |
| Acrylic Emulsion* | 4.1 |
| Water | 4.02 |

*Supplied by Rohm and Haas Company under the trade name Rhoplex EC-1685.

An aqueous dispersion of the sodium silicate was added first to a mixing vessel, and the powdered filler materials were then charged to the vessel with mixing. The acrylic emulsion was next added and the batch was mixed for 8 minutes. Finally, the major portion of the water was pumped into the mixer and allowed to mix for 20 minutes to produce a caulking composition of the invention.

The caulk was evaluated with the following results:

| Property | Test Results |
| --- | --- |
| % Solids | 71.5 |
| Density (lbs./gal) | 14.7 |
| Brookfield Viscosity (poise) at R.T., No. 75 spindle - 20 rpm 1 min. reading | 900 (750–1500) |
| Dry time (dry to touch), minutes | <10 |
| pH | 10.7 |
| Freeze-Thaw (16 hrs. cold/8 hrs. R.T.) | |
| a. 32° F. | Does not freeze |
| b. 0° F. | Freezes, usable on thawing |

Whereas the present invention has been described with respect to specific embodiments thereof, it should be understood that the invention is not limited thereto as many modifications thereof may be made. It is, therefore, contemplated to cover by the present application any and all such modifications as fall within the true spirit and scope of the appended claims.

I claim:

1. A process for sealing geological formations and mine stoppings comprising applying to said substrates an aqueous, non-cementitious caulk composition comprising 30 to 65% by weight of sodium silicate; 30 to 65% by weight of filler material containing at least one component selected from the group consisting of silica, a silicate other than sodium silicate, and mixtures thereof; 2 to 12% by weight of a water-soluble or water-dispersible acrylic polymer; and 2 to 12% by weight of water, and allowing said caulk composition to dry to form an air flow resistant seal on said substrates.

2. The process of claim 1 wherein said acrylic polymer is a homopolymer or copolymer of a member selected from the group consisting of acrylates, methacrylates, acrylamides, methacrylamides, acrylic acid, methacrylic acid and mixtures thereof.

3. The process of claim 1 wherein said acrylic polymer is a self-plasticizing polymer having a low Tg.

4. The process of claim 1 wherein said caulk composition contains a thickening agent.

5. The process of claim 1 wherein said sodium silicate is one having a molar ratio of 1 to 4 moles of $SiO_2$ to 1 mole of $Na_2O$.

6. The process of claim 5 wherein said acrylic polymer is a homopolymer or copolymer of a member selected from the group consisting of acrylates, methacrylates, acrylamides, methacrylamides, acrylic acid, methacrylic acid and mixtures thereof.

7. The process of claim 5 wherein said caulk composition contains a thickening agent.

8. The process of claim 7 wherein said caulk composition comprises 35 to 60% by weight of said sodium silicate; 35 to 60% by weight of a filler material comprising at least one silicate other than sodium silicate; 4 to 9% by weight of said acrylic polymer; 0.5 to 3% by weight of said thickening agent; and 2 to 12% by weight of water.

9. The process of claim 8 wherein said acrylic polymer is a self-plasticizing polymer having a low Tg.

10. The process of claim 9 wherein said silicate filler is a mixture of alumina silicate and mica and said thickening agent is bentonite clay.

11. The process of claim 10 wherein said caulk composition comprises 40 to 45% by weight of sodium silicate; 40 to 45% by weight of alumina silicate; 5 to 8% by weight of mica; 4 to 9% by weight of said acrylic polymer; 0.5 to 1% by weight of bentonite clay; and 2 to 6% by weight of water.

12. An aqueous, non-cementitious caulk composition for application to geological formations and mine stoppings to form an air flow resistant seal on said substrates comprising (a) 30 to 65% by weight of sodium silicate; (b) 30 to 65% by weight of filler material containing at least one component selected from the group consisting of silica; a silicate other than sodium silicate, and mixtures thereof; (c) 2 to 12% by weight of a water-soluble or water-dispersible acrylic polymer; and (d) 2 to 12% by weight of water.

13. The caulk composition of claim 12 wherein a thickening agent is included.

14. The caulk composition of claim 13 wherein said acrylic polymer is a self-plasticizing polymer having a low Tg.

15. The caulk composition of claim 14 wherein said filler material comprises at least one silicate other than sodium silicate and said sodium silicate comprises 35 to 60% by weight, said filler material 35 to 60% by weight; said acrylic polymer 4 to 9% by weight, said thickening agent 0.5 to 3% by weight, and said water 2 to 12% by weight of the total caulk composition.

16. The caulk composition of claim 15 wherein said silicate filler is a mixture of alumina silicate and mica and said thickening agent is bentonite clay, and said sodium silicate comprises 40 to 45% by weight, said alumina silicate 40 to 45% by weight, said mica 5 to 8% by weight, said acrylic polymer 4 to 9% by weight, said bentonite clay 0.5 to 1% by weight, and said water 2 to 6% by weight of the total caulk composition.

17. In a process for sealing geological formations and mine stoppings by applying to said substrates a sealant composition and allowing said sealant composition to dry to form an air flow resistant seal on said substrates, the improvement wherein said sealant composition is an aqueous, non-cementitious mixture comprising sodium silicate; a filler materal containing at least one component selected from the group consisting of silica, a silicate other than sodium silicate, and mixtures thereof; a water-soluble or water-dispersible acrylic polymer; and water.

18. The process of claim 17 wherein said non-cementitious mixture contains a thickening agent.

19. The process of claim 18 wherein said acrylic polymer is a self-plasticizing polymer having a low Tg.

* * * * *